United States Patent [19]

Brackette, Jr.

[11] Patent Number: 5,125,681
[45] Date of Patent: Jun. 30, 1992

[54] METHOD AND APPARATUS FOR DETERMINING THE DISPLACEMENT OF A PISTON WITHIN A SHOCK ABSORBER

[75] Inventor: Daniel Brackette, Jr., Toledo, Ohio

[73] Assignee: Monroe Auto Equipment Company, Monroe, Mich.

[21] Appl. No.: 617,677

[22] Filed: Nov. 26, 1990

[51] Int. Cl.⁵ .............................................. B60G 11/26
[52] U.S. Cl. ...................................... 280/707; 73/658; 324/207.11; 280/DIG. 1; 280/840
[58] Field of Search ............ 280/707; 73/658; 324/71.1, 207.11; 200/DIG. 1, 840

[56] References Cited

U.S. PATENT DOCUMENTS

| | | |
|---|---|---|
| 2,564,221 | 8/1951 | Hornfeck . |
| 3,827,291 | 8/1974 | McCalvey . |
| 4,017,099 | 4/1977 | Hegel . |
| 4,127,814 | 11/1978 | Rasigade . |
| 4,141,572 | 2/1979 | Sorensen . |
| 4,471,304 | 9/1984 | Wolf . |
| 4,502,006 | 2/1985 | Goodwin . |
| 4,587,850 | 5/1986 | Moser ............................ 324/207 |
| 4,623,840 | 11/1986 | Fujimura . |
| 4,674,768 | 6/1987 | Morra . |
| 4,726,453 | 2/1988 | Obstfelder . |
| 4,729,459 | 3/1988 | Inagaki . |
| 4,749,070 | 6/1988 | Moser . |
| 4,788,489 | 11/1988 | Kobayashi . |
| 4,802,657 | 2/1989 | Wijnhoven . |
| 4,909,536 | 3/1990 | Hale . |
| 4,923,038 | 5/1990 | Lizell . |
| 4,995,635 | 2/1991 | Guy . |
| 5,000,478 | 3/1991 | Kerastas . |
| 5,007,659 | 4/1991 | Guy . |

FOREIGN PATENT DOCUMENTS

| | | |
|---|---|---|
| 2911768 | 10/1980 | Fed. Rep. of Germany . |
| 3425988A1 | 1/1986 | Fed. Rep. of Germany . |
| 87028174 | 2/1987 | Fed. Rep. of Germany . |
| 1130621 | 9/1955 | France . |
| 59-128941U | 8/1984 | Japan . |
| 61-113041(A) | 1/1986 | Japan . |
| 1120009 | 7/1968 | United Kingdom . |
| 2106651A | 4/1983 | United Kingdom . |
| 2163260A2 | 2/1986 | United Kingdom . |
| 2177475A | 1/1987 | United Kingdom . |

Primary Examiner—Kenneth R. Rice
Attorney, Agent, or Firm—Harness, Dickey & Pierce

[57] ABSTRACT

An apparatus for determining the displacement of a piston within a shock absorber. The shock absorber includes a pressure cylinder forming a working chamber having first and second portions operable to store damping fluid. A piston is provided for controlling the flow of damping fluid between the first and second portions of the working chamber. Finally, a capacitance sensor is used for determining the position of the piston with respect to the pressure cylinder so that the displacement of the piston may be determined.

18 Claims, 2 Drawing Sheets

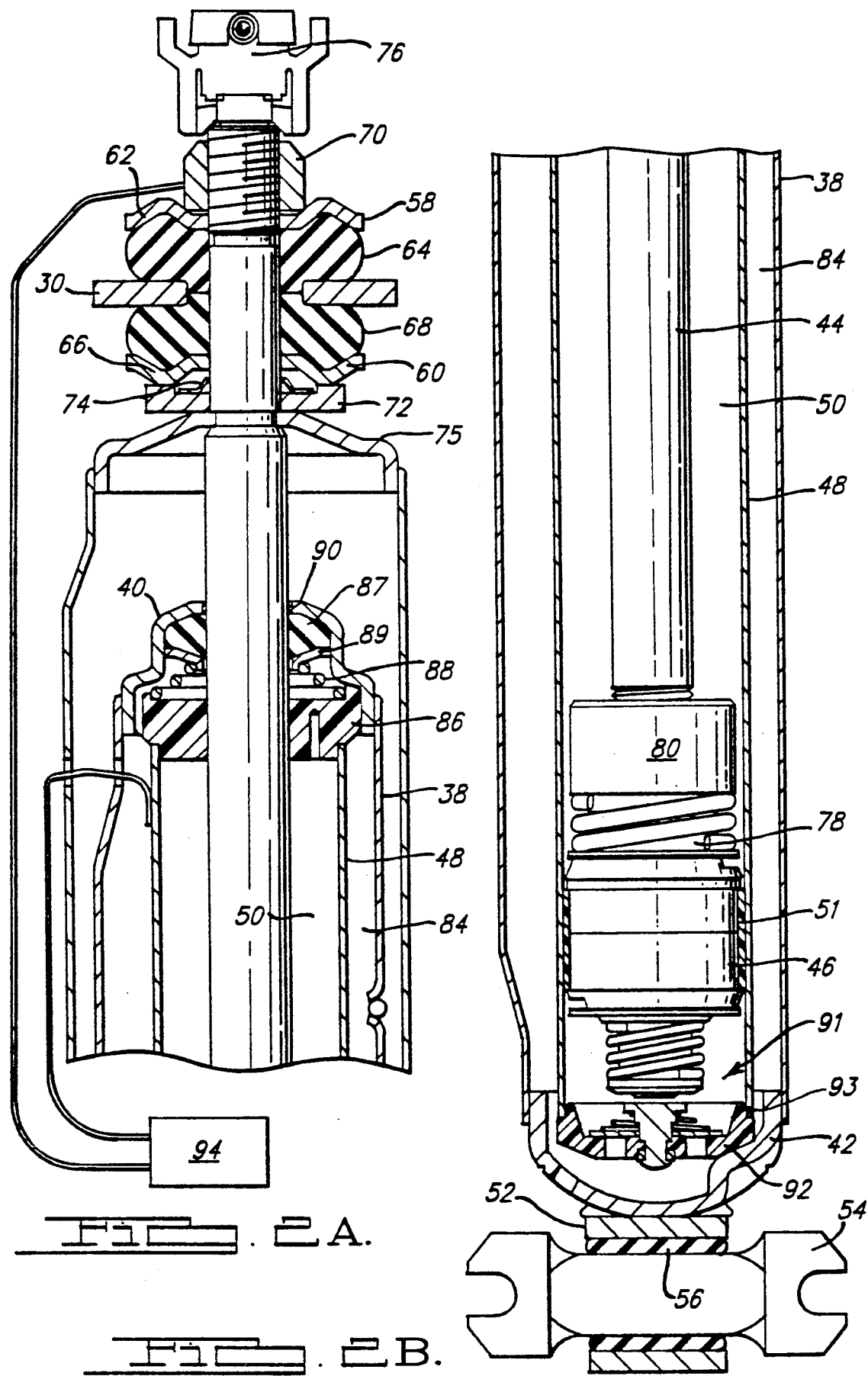

METHOD AND APPARATUS FOR DETERMINING THE DISPLACEMENT OF A PISTON WITHIN A SHOCK ABSORBER

BACKGROUND OF THE INVENTION

1. Field of the Invention

This invention relates to suspension systems for automobiles and machines which receive mechanical shock, and more particularly to a method and apparatus for determining the displacement of a piston within a shock absorber.

2. Description of Related Art

Shock absorbers are used in connection with automotive suspension systems to absorb unwanted vibrations which occur during driving. To dampen unwanted vibrations, shock absorbers are generally connected between the body and the suspension of the automobile. A piston assembly is located within the shock absorber and is connected to the body of the automobile through a piston rod. Because the piston assembly is able to limit the flow of damping fluid within the working chamber of the shock absorber when the shock absorber is compressed or extended, the shock absorber is able to provide a damping force which "smooths" or "dampens" vibrations transmitted from the suspension to the body.

The greater the degree to which the flow of damping fluid within the working chamber is restricted by the piston assembly, the greater the damping forces which are provided by the shock absorber. Acccordingly, a "soft" compression and rebound stroke is produced when the flow of damping fluid in the working chamber is relatively unrestricted. In contrast, a "firm" compression and rebound stroke is produced when there is an increased restriction in the flow of damping fluid in the working chamber.

In selecting the amount of damping that a shock absorber is to provide, three vehicle performance characteristics are often considered: ride comfort, vehicle handling and road holding ability. Ride comfort is often a function of the spring constant of the main springs of the vehicle, as well as the spring constant of the seat, tires, and the damping of the shock absorbers. Vehicle handling is related to the variation in the vehicle's attitude (i.e., roll, pitch and yaw). For optimum vehicle handling, relatively large damping forces are required to avoid excessively rapid variation in the vehicle's attitude during cornering, acceleration, and deceleration. Road holding ability is generally a function of the amount of contact between the tires and the ground. To optimize road holding ability, large damping forces are required when driving on irregular surfaces to prevent loss of contact between the wheels and the ground for an excessive period of time.

Because different driving characteristics depend on the amount of damping forces the shock absorber provides, it is often desirable to have a shock absorber in which the amount of damping forces generated by the shock absorber is adjustable. One method for selectively changing the damping characteristics of a shock absorber is disclosed in European Patent Application Publication No. 0 186 908 A2. In European Patent Application Publication No. 0 186 908 A2, a controller detects the distance between the body of the automobile and the front wheel so as to determine the contour of the surface. A rotary valve in each of the rear shock absorbers is then adjusted so that the rear shock absorbers are able to provide the desired amount of damping forces.

Another method for selectively changing the damping characteristics of a shock absorber is disclosed in PCT International Publication No. WO 88/06983. In PCT International Publication No. WO 88/06983, the shock absorber has a solenoid which controls the flow of damping fluid into pressure chambers which are located adjacent to valve disks which control the damping characteristics of the shock absorber. Upon movement of the plunger of the solenoid, the pressure in these pressure chambers changes so that the damping characteristics of the shock absorber may be varied.

Some of the methods which are used for selectively changing the damping characteristics of a shock absorber require that the displacement of the piston within the pressure cylinder be known. This information is used for determining the velocity and acceleration of the sprung portion of the automobile with respect to the unsprung portion so that the appropriate damping forces may be generated. One method for sensing the position of the piston in the pressure cylinder is disclosed in U. S. Pat. No. 4,788,489. However, this reference requires that both the reserve tube and the piston rod be grounded while the pressure cylinder is electrically insulated from the piston rod and the reserve tube. Furthermore, this reference requires that the piston be made of an electrically insulating material, and that the pressure cylinder be electrically insulated from the reserve tube at a region near the base valve.

SUMMARY OF THE INVENTION

Accordingly, a primary object of the present invention is to provide a method and apparatus for determining the displacement of the piston within a shock absorber. In this regard, a related object of the present invention is to provide a method and apparatus for determining the velocity and acceleration of a piston within the pressure cylinder of a shock absorber.

Another object of the present invention is to provide a method and apparatus for determining the displacement of a piston within a shock absorber in which the position of the piston may be determined by measuring the capacitance between the pressure cylinder and the piston rod.

Another object of the present invention is to provide a method and apparatus for determining the displacement of a piston within a shock absorber in which the number of components within the shock absorber can be minimized. In this regard, a related object of the present invention is to provide method and apparatus for determining the displacement of a piston within a shock absorber which is low in cost.

Another object of the present invention is to provide a method and apparatus for determining the displacement of the piston within a shock absorber which is relatively simple and may be used in conjunction with dynamic adjustment of the damping characteristics of the shock absorber.

BRIEF DESCRIPTION OF THE DRAWINGS

Other objects of the present invention will become apparent to one skilled in the art upon reading the following specification and by reference to the following drawings in which:

FIGS. 2A and 2B is the schematic representation of the shock absorber using the method and apparatus for determining the displacement of a piston within a shock absorber according to the teachings of the preferred embodiment of the present invention.

DESCRIPTION OF THE PREFERRED EMBODIMENT

Figure 1:
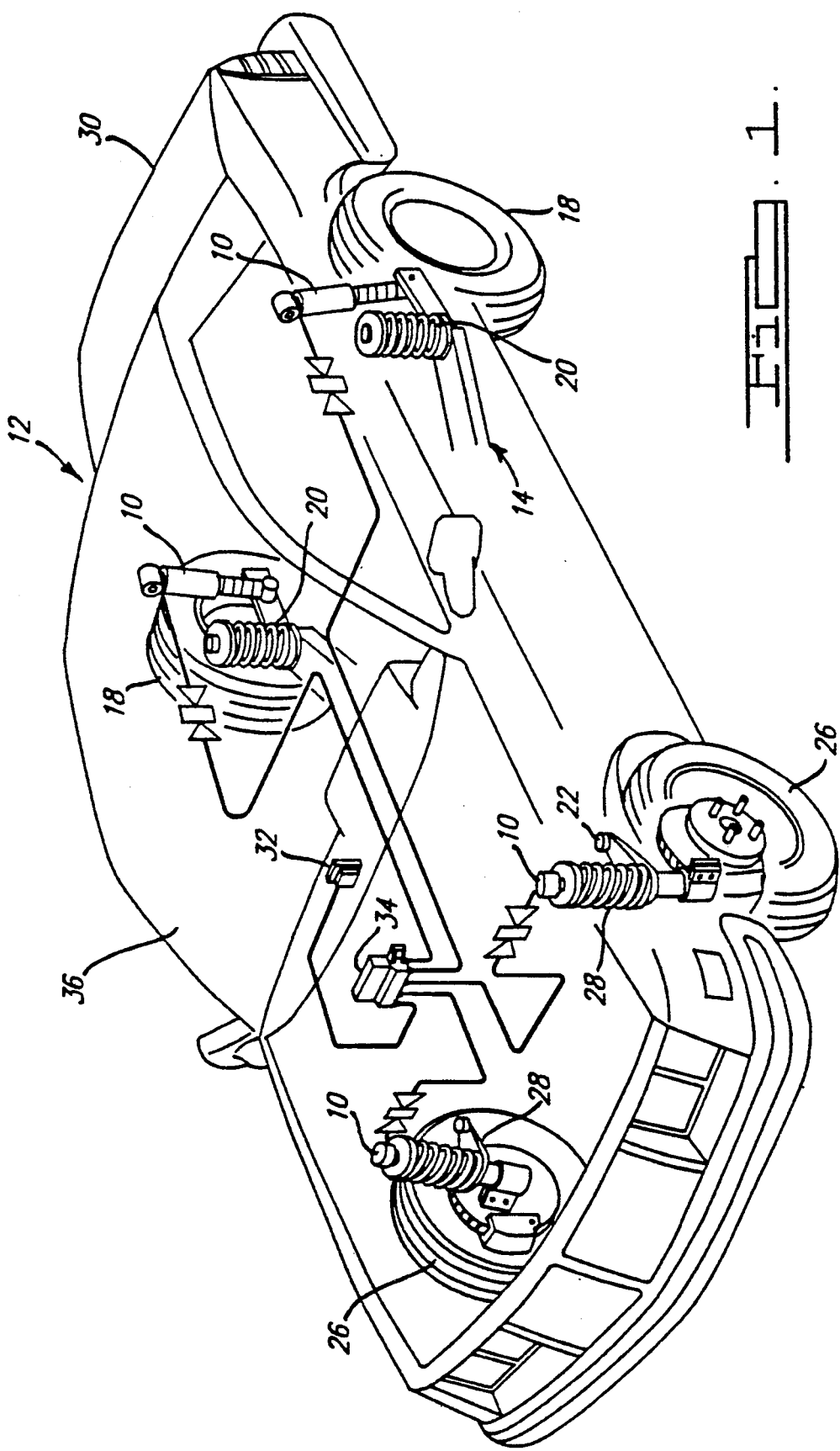
FIG. 1 is an illustration of an automobile using the method and apparatus for determining the displacement of a piston within a shock absorber according to the teachings of the preferred embodiment of the present invention.

Referring to FIG. 1, a plurality of four shock absorbers 10 according to the preferred embodiment of the present invention are shown. The shock absorbers 10 are depicted in operative association with a diagrammatic representation of a conventional automobile 12. The automobile 12 includes a rear suspension system 14 having a transversely extending rear axle assembly (not shown) adapted to operatively support the vehicle's rear wheels 18. The rear axle assembly is operatively connected to the automobile 12 by means of a pair of shock absorbers 10 as well as by the helical coil springs 20. Similarly, the automobile 12 has a front suspension system 22 including a transversely extending front axle assembly (not shown) to operatively support the front wheels 26. Front axle assembly is operatively connected to the automobile 12 by means of a second pair of shock absorbers 10 and by the helical coil springs 28. The shock absorbers 10 serve to damp the relative movement of the unsprung portion (i.e., the front and rear suspension systems 22 and 14) and the sprung portion (i.e., the body 30) of the automobile 12. While the automobile 12 has been depicted as a passenger car, the shock absorber 10 may be used with other types of automotive vehicles or in other types of applications. Further, the term "shock absorber" as used herein will refer to shock absorbers in the general sense of the phrase and will include MacPherson struts. In addition, the shock absorbers may be used with other types of suspension systems as well.

To allow the damping characteristics of the shock absorbers 10 to be controlled, a mode select switch 32 and an electronic control module 34 are provided. The mode select switch 32 is located within the passenger compartment 36 of the automobile 12 and is accessible by the occupants of the automobile 12. The mode select switch 32 is used for selecting which type of damping characteristics the shock absorbers 10 are to provide (i.e., firm, soft or automatic). The electronic control module 34 receives the output from the mode select switch 32 and is used for generating electronic control signals for controlling damping characteristics of the shock absorbers 10. By controlling the damping characteristics of the shock absorbers 10, the shock absorbers 10 are able to dampen relative movement between the body 30 and the suspension of the automobile 12 in such a manner as to optimize both ride comfort and road handling ability simultaneously.

The structure of the shock absorbers 10 will now be described with reference to FIGS. 2A and 2B. The shock absorber 10 comprises an elongated reserve tube 38 which engages a cup-shaped oil cap 40 at the upper end of the reserve tube 38. The reserve tube 38 also engages a base cup 42 at the lower end of the reserve tube 38 so as to form a chamber which is able to store damping fluid. Extending axially through the oil cap 40 is a piston rod 44 which is secured to a reciprocating piston assembly 46 at the lower end of the piston rod 44. The piston assembly 46 is axially displaceable within an elongated tubular pressure cylinder 48 which is disposed within the reserve tube 38. The pressure cylinder 48 defines a working chamber 50 in which the upper portion of the working chamber 50 is located above the piston assembly 46, while the lower portion of the working chamber 50 is located below the piston assembly 46. Disposed between the piston assembly 46 and the pressure cylinder 48 is a Teflon sleeve 51 which is used to facilitate movement of the piston assembly 46 with respect to pressure cylinder 48. While the piston assembly 46 may be that which is disclosed in U.S. Ser. No. 322,774 filed on Mar. 13, 1989, which is hereby incorporated by reference, other suitable piston assemblies may be used.

To connect the shock absorber 10 to the rear axle assembly of the automobile 12, the shock absorber 10 comprises a circular end fitting 52. The circular end fitting 52 is secured to the base cup 42 of the shock absorber 10 by a suitable means such as welding. Within the circular end fitting 52 is disposed a mounting pin 54 disposed within a bushing 56 which is adapted to engage the axle assembly of the automobile 12. To connect the shock absorber 10 to the body 30 of the automobile 12, a first retainer 58 and a second retainer 60 are provided. The first retainer 58 and the second retainer 60 are disk shaped and have a central aperture operable to receive the piston rod 44. The first retainer 58 is disposed above the body 30, while the second retainer 60 is disposed below the body 30. The first retainer 58 has an upwardly facing annular indentation 62 which is able to accommodate a first disk-shaped cushion 64 which is disposed between the body 30 of the automobile 12 and the first retainer 58. Similarly, the second retainer 60 has a downwardly facing annular indentation 66 which is operable to receive a second disk-shaped cushion 68 which is disposed between the body 30 of the automobile 12 and the second retainer 60.

The shock absorber 10 further comprises a self-locking nut 70 which is disposed on the piston rod 44 immediately above the first retainer 58. The self-locking nut 70 has an internally threaded bore which is able to threadably engage the threaded upper end portion of the piston rod 44. Accordingly, by rotating the self-locking nut 70 on the upper portion of the piston rod 44, both the first retainer 58 and the first cushion 64 are displaced in a direction toward the body 30 of the automobile 12.

The second retainer 60 is positionally secured in part by means of an annular spacer 72 which is disposed immediately above the oil cap 40. The spacer 72 has a central bore which is able to receive the upper end portion of the piston rod 44. A pal nut 74 is disposed between the second retainer 60 and the spacer 72. The pal nut 74 is generally disk shaped and has a central bore which is able to receive the piston rod 44. The pal nut 74 is used to locate and secure the spacer 72.

To permit electrical communication between the electronic control module 34 and the shock absorber 10, the shock absorber 10 further comprises an electrical connector assembly 76. The electrical connector assembly 76 allows for rapid electrical decoupling of the shock absorber 10 from the electronic control module 34 so that the shock absorber 10 may be replaced. The electrical connector assembly 76 may be of the type which is shown in U.S. Ser. No. 377,236 filed on Jul. 7, 1989, though other suitable electrical connectors may be used.

To support the piston assembly 46 on the piston rod 44, an axially extending piston post 78 and a piston post rod nut 80 are provided. The piston post 78 is generally circular in cross-section and extends axially through the central bore (not shown) of the piston assembly 46. The piston post 78 is secured to the piston rod 44 by the piston post rod nut 80. The piston post rod nut 80 is annularly shaped and comprises an internally threaded bore which is able to mate with the externally threaded lower portion of the piston rod 44.

To support the piston rod 44 within the working chamber 50, a rod guide 86 is provided. The rod guide 86 is disposed at the upper end of the pressure cylinder 48. The rod guide 86 has a centrally disposed bore which is able to receive and provide lateral support to the piston rod 44. The rod guide 86 should preferably be made from an electrically insulating material such as ceramic, though other suitable materials may be used. To prevent damping fluid from leaking from the shock absorber 10 between the piston rod 44 and the oil cap 40, an annular oil seal 87 is provided. The annular oil seal 87 is disposed adjacent to the oil cap 40 and the piston rod 44 so as to prevent damping fluid from leaking therebetween during movement of the piston rod 44. The oil seal 87 is upwardly secured against the oil cap 40 by means of an oil seal spring 88 which exerts an upwardly directed force on the oil seal 87 by means of an oil seal retainer 89 which is disposed between oil seal 87 and the oil seal spring 88. An anti-extrusion ring 90 is also disposed between the oil cap 40 and the piston rod 44 which is used to prevent the oil seal 87 from extrusion through the oil cap 40 upon upward movement of the piston rod 44. While the anti-extrusion ring 90 should preferably be made from an electrically insulating material such as ceramic, other suitable materials may be used.

A base valve, generally designated by the numeral 91, is located in the lower end of the pressure cylinder 48 and is used to control the flow of damping fluid between the working chamber 50 and the reservoir 84. The base valve 91 comprises a generally cup-shaped pressure cylinder end portion 92 which is disposed co-axially with, and adjacent to, the lower portion of the pressure cylinder 48. The end portion 92 contains a peripherally upwardly disposed recess 93 which is operable to engage the lower portion of the pressure cylinder 48. The pressure cylinder 48 is secured to the recess 93 by a suitable means such as a press fit.

To provide means for determining the position of the piston assembly 46 with respect to the pressure cylinder 48, a capacitance sensor 94 is provided. The capacitance sensor 94 is used to determine the capacitance between the inner surface of the pressure cylinder 48 and the piston rod 44/piston assembly 46. The capacitance sensor 94 is therefore electrically connected to the piston rod 44 as well as the pressure cylinder 48. It has been determined that the capacitance between the piston rod 44/piston assembly 46 and the inner surface of the pressure cylinder 48 may be approximated as follows:

$$C = K \frac{2\pi\epsilon_0 l}{\mathrm{Ln}(b/a)}$$

where:

K = Dielectric constant of the Teflon sleeve 51 and the damping fluid
$\epsilon_0$ = permittivity of a vacuum
l = length of the pressure cylinder 48 above the piston assembly 46
a = radius of the piston rod 44
b = radius of the inner surface of the pressure cylinder 48.

Accordingly, the capacitance between the piston rod 44/piston assembly 46 and the inner surface of the pressure cylinder 48 will change in response to the change in the displacement of the piston assembly 46 within the pressure cylinder 48. For this reason, the displacement of the piston assembly 46 may be determined by measuring the capacitance between the piston rod 44/piston assembly 46 and the inner surface of the pressure cylinder 48. In addition, because the displacement may be differentiated, the velocity as well as acceleration of the piston assembly 46 may also be determined.

The manner in which the shock absorber 10 of the present invention is used will now be described. The electronic control module 34 first senses the capacitance between the piston rod 44/piston assembly 46 and the pressure cylinder 48. The electronic control module 34 uses this information to determine the degree of compression and rebound of the shock absorber 10. The electronic control module 34 then adjusts the flow of damping fluid through the piston assembly 46 in response to the changes in capacitance between the piston rod 44/piston assembly 46 and the pressure cylinder 48.

The capacitance sensor 94 may be disposed within the electronic control module 34, though it may be disposed in other regions of the automobile 12 which are accessible to the shock absorber 10. It will be noted that the shock absorber 10 does not require the use of an accelerometer for determining the displacement of the piston assembly 46 within the pressure cylinder 48. For this reason, the shock absorber 10 is simpler than that which would be required if the shock absorber 10 used an accelerometer for sensing piston displacement. Furthermore, there is no need for insulating the pressure cylinder 48 from the reserve tube 38, nor a need to fabricate the piston assembly 46 from electrically insulating material as required in other methods for capacitively sensing the displacement of the piston assembly 46.

It will be appreciated that only the preferred embodiment of the present invention was described above. For example, other embodiments may sense the capacitance between the reserve tube and the piston rod. It will also be appreciated that the present invention is susceptible to modification, variation and change without departing from the scope of the invention.

What is claimed is:

1. A shock absorber comprising:
   a pressure cylinder forming a working chamber having first and second portions operable to store damping fluid;
   valve means for controlling the flow of damping fluid between said first and said second portions of said working chamber;
   a Teflon sleeve disposed between said valve means and said pressure cylinder; and
   means for determining the position of said valve means with respect to said pressure cylinder by determining the capacitance between said pressure cylinder and said valve means.

2. The shock absorber according to claim 1, wherein said valve means comprises a piston assembly disposed within said pressure assembly and wherein said Teflon sleeve is disposed between said piston assembly and said pressure cylinder.

3. The shock absorber of claim 2, wherein said pressure cylinder comprises an interior surface forming a first conductor and said piston rod forming a second conductor, said first and second conductors operable to form a capacitor.

4. The shock absorber of claim 3, wherein said teflon sleeve forms a dielectric between said first and second conductors.

5. The shock absorber of claim 4, wherein said means for determining the position of said valve means is operable to determine the position of said piston assembly with respect to said pressure cylinder by measuring the capacitance between said first and second conductors.

6. The shock absorber of claim 5, wherein said capacitance approximately varies according to the following equation:

$$C = K \frac{2\pi \epsilon_o l}{\text{Ln}(b/a)}$$

where:
C = capacitance,
K = dielectric constant of said Teflon sleeve and said damping fluid,
$\epsilon_o$ = permittivity of a vacuum,
l = length of said pressure cylinder above said pistonassembly,
a = radius of said piston rod, and
b = radius of said interior surface of said pressure cylinder.

7. A suspension system for controlling the movement between the sprung and unsprung portions of an automobile, said suspension system comprising:
 a plurality of shock absorbers disposed between the sprung and unsprung portions of said automobile, each of said shock absorbers comprising:
  a. a pressure cylinder forming a working chamber having first and second portions operable to store damping fluid,
  b. valve means for controlling the flow of damping fluid between said first and second portions of said working chamber during compression of said shock absorbers, and
 means for changing the damping characteristics generated by at least one of said shock absorbers in response to the change in capacitance between said pressure cylinder and said valve means of said one shock absorber.

8. The suspension system of claim 7, further comprising a Teflon sleeve disposed between said valve means and said pressure cylinder of said one shock absorber.

9. The suspension system of claim 8, wherein said pressure cylinder of said one shock absorber comprises an interior surface forming a first conductor and said piston rod forming a second conductor, said first and second conductors operable to form a capacitor.

10. The suspension system of claim 9, wherein said Teflon sleeve forms a dielectric between said first and second conductors.

11. The suspension system of claim 10, wherein said means for changing the damping characteristics of at least one of said shock absorbers is operable to determine the position of said valve means of said one shock absorber with respect to said pressure cylinder of said one shock absorber by measuring the capacitance between said first and second conductors.

12. The suspension system of claim 11, wherein said capacitance approximately varies according to the following equation:

$$C = K \frac{2\pi \epsilon_o l}{\text{Ln}(b/a)}$$

where:
C = capacitance,
K = dielectroc constant of said Teflon sleeve and said damping fluid,
$\epsilon_o$ = permittivity of a vacuum,
l = length of said pressure cylinder of said one shock absorber above said valve means of said one shock absorber,
a = radius of said piston rod, and
b = radius of said inner surface of said pressure cylinder of said one shock absorber.

13. A method for adjusting the damping characteristics of a shock absorber during compression and rebound, said shock absorber having a piston assembly disposed within a pressure cylinder, said method comprising the steps of:
 sensing the capacitance between said piston rod and said pressure cylinder; and
 adjusting the flow of damping fluid through said piston assembly in response to the change in capacitance between said piston rod and said pressure cylinder.

14. The method of claim 13, wherein said capacitance between said piston rod and said pressure cylinder changes in response to the position of said piston assembly within said pressure cylinder.

15. The method of claim 13, wherein the change of the capacitance between said piston rod and said pressure cylinder is responsive to the degree of compression of said shock absorber.

16. The method of claim 13, wherein the change of the capacitance between said piston rod and said pressure cylinder is responsive to the degree of rebound of said shock absorber.

17. The method of claims 14, comprising the step of disposing a teflon sleeve between said piston assembly and said pressure cylinder, said teflon sleeve operable to form a dielectric between said pressure cylinder and said piston assembly.

18. The method of claim 13, wherein said piston comprises a radially extended surface and said pressure cylinder comprises an inner surface, said capacitance approximately varies according to the following equation:

$$C = \frac{2\pi \epsilon_o l}{\text{Ln}(b/a)}$$

where:
C = capacitance,
$\epsilon_o$ = permittivity of a vacuum sleeve,
l = length of said pressure cylinder above said piston,
a = radius of said radially extended surface of said piston, and
b = radius of said inner surface of said pressure cylinder.

* * * * *